Patented Aug. 14, 1923.

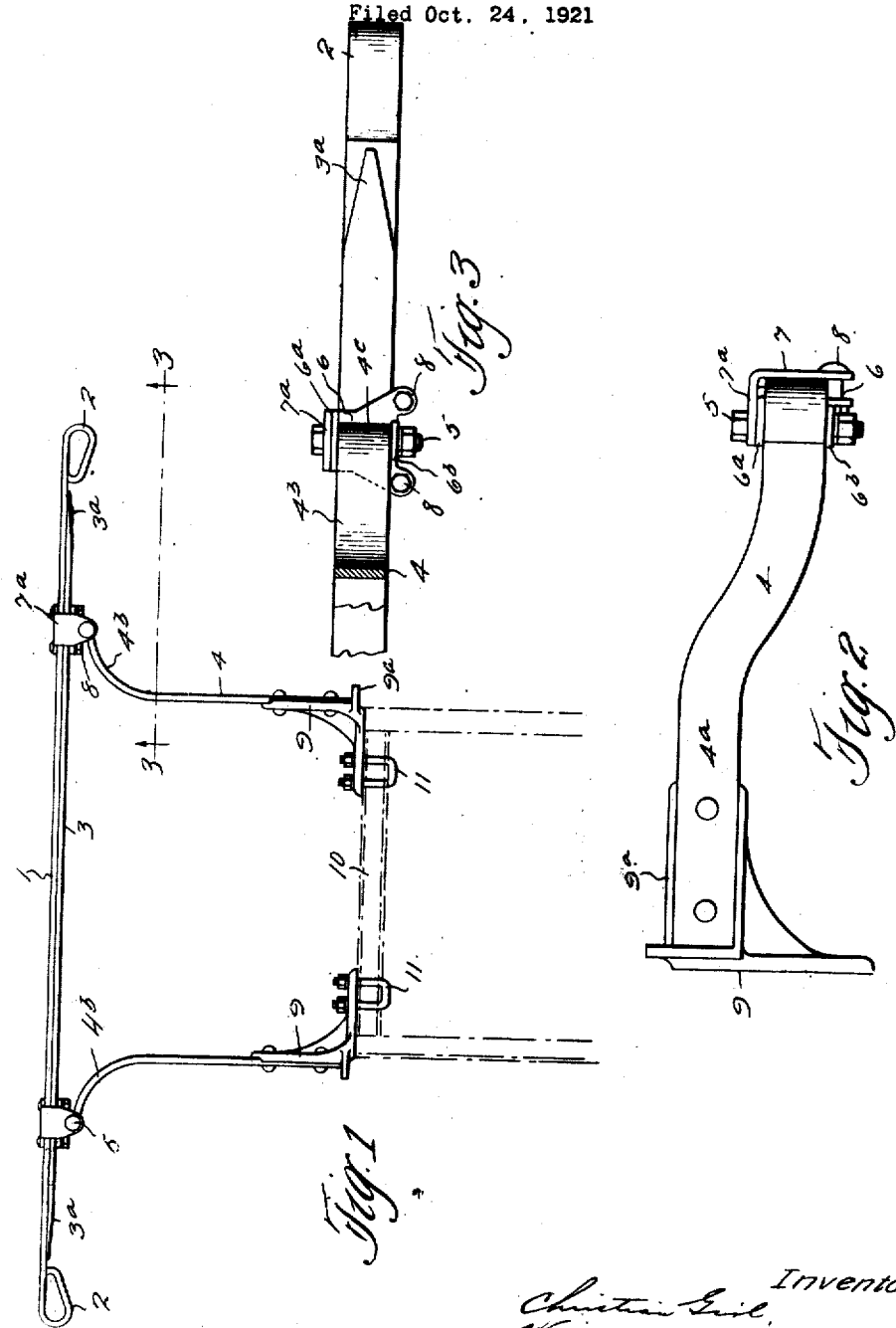

1,464,603

UNITED STATES PATENT OFFICE.

CHRISTIAN GIRL AND WAYNE E. DUNSTON, OF KALAMAZOO, AND JOHN G. UTZ, OF DETROIT, MICHIGAN.

BUMPER.

Application filed October 24, 1921. Serial No. 509,783.

*To all whom it may concern:*

Be it known that we, CHRISTIAN GIRL and WAYNE E. DUNSTON, citizens of the United States, residing at Kalamazoo, in the county of Kalamazoo and State of Michigan, and JOHN G. UTZ, a citizen of the United States, residing at Detroit, in the county of Wayne and State of Michigan, have invented certain new and useful Improvements in Bumpers, of which the following is a full, clear, and exact description, reference being had to the accompanying drawings.

This invention relates to bumpers such as are employed with automobiles, and more particularly to bumpers of the flat spring plate type. The general object of the invention is to provide a bumper of this character which is particularly economical of production and efficient in operation. A further object of the invention is to provide a bumper which is especially adaptable for use with light cars, and more especially cars of the Ford type.

In the drawings forming part hereof, Fig. 1 represents a plan view of a bumper constructed in accordance with our invention, together with the cooperating front portion of an automobile of the Ford type and the connections for securing a bumper thereto; Fig. 2 is a side elevation of the bumper and of the supporting means therefor as shown in Fig. 1; and Fig. 3 a detail in section corresponding to the line 3—3 of Fig. 1 and looking in the direction of the arrows.

Describing the various parts by reference characters and, for convenience of description, referring to the impact-receiving portion of the bumper as the "front" portion thereof, 1 denotes a continuous flat spring plate constituting the front, or impact-receiving, plate of the bumper. This plate is provided at each end with an eye or loop 2 for the purposes of strengthening such ends as well as affording means for ready disengagement with an object which may be encountered thereby. This loop or eye is wide and rounded at its outer end and is tapered inwardly from such end toward the inner end, whereby the disengagement referred to is facilitated.

Secured to the front plate 1 in a manner to be described hereinafter is a rear plate 3. This plate extends nearly to the end loops or eyes 2 and has its extreme ends beveled and reversely tapered, as indicated at 3ª, whereby the ends of the bumper which project beyond the clamping means oppose a progressively increasing yielding resistance to blows or impacts received upon such ends.

The plates 1 and 3 are connected together and supported by means of clamps and spring arms. Each spring arm is indicated at 4 and each comprises a portion extending rearwardly or towards the body of the vehicle from the plates 1 and 3 and substantially at right angles thereto, each such rearwardly extending portion being upwardly bent or deflected at its inner or rear portion, as indicated at 4ª, such deflection being for the purpose of supporting the impact section of the bumper at a proper height with respect to the roadway and at the same time enabling the bumper to be secured to the cross member of a car of the Ford type. Each of the spring arms 4 has its outer end bent outwardly, as shown at 4ᵇ, and is provided in such out-turned end with an eye 4ᶜ, whereby it is connected to the plates 1 and 3 by means of a bolt 5 extending through the members 6 and 7 of a clamp. This clamp may be of any desired construction, but is preferably constructed in the manner shown and described in the application of Wayne E. Dunston No. 491,110, filed August 10, 1921. The clamp comprises a pair of vertical portions, each having an inwardly projected upper end 6ª, 7ª, respectively, and the inner member 6 having an inwardly extending bottom projection 6ᵇ, the said ends and projection forming a support for the eye 4ᶜ and the bolt 5, the bottoms of the vertical portions being connected by bolts 8.

The inner, or rear end, portion 4ª of each of the spring arms is riveted or otherwise secured within a seat 9ª of a bracket 9 which is secured to the appropriate end portion of the cross member or bolster 10 by means of U-bolts 11. Each of the brackets 9 is also provided with a projection 9ᵉ which is adapted to receive one of the arms or brackets of another U-bolt adapted to extend around the front fender bracket of an automobile of the Ford type.

By the construction and arrangement of the plates 1 and 3, impacts received upon the ends of the former plate are yieldingly transmitted by the beveled and reversely tapered ends 3ª to the plate 3. Furthermore, the hinged connection between each of the arms 4 and the outer portion of the fender proper enables motion to be transmitted from either end portion of the bumper (between the frame and the wheel) to the center of the bumper, and in turn from such portion of the bumper to the remainder thereof. In addition, the spring arms 4 provide a yielding connection between the bumper and the hinges thereof and the cross member of the vehicle.

Having thus described our invention, what we claim is:

1. A bumper having an impact section comprising a flat yieldable plate adapted to extend across a vehicle, and a reinforcing plate secured to the rear of the first mentioned plate and having its ends within and in proximity to the ends of such plate, the ends of the second plate being of progressively increasing strength from the outer ends thereof inwardly, and supporting members pivotally connected to said section within the ends of the second plate.

2. A bumper comprising a flat yieldable plate adapted to extend across a vehicle, a reinforcing plate at the rear of the first mentioned plate and having its ends within and in proximity to the ends of such plate, a pair of clamps connecting the said plates within and spaced from the ends of the second plate, a spring arm pivotally connected to each of said clamps, and means for securing each of said arms to a member of such vehicle.

3. A bumper comprising a flat yieldable plate adapted to extend across a vehicle, a reinforcing plate bearing against the first mentioned plate and having its ends within and in proximity to the ends of such plate, a pair of yieldable arms, and a hinge connection between the outer end of each such arm and the end portion of each such reinforcing plate.

4. A bumper comprising a flat yieldable plate adapted to extend across a vehicle, and a reinforcing plate bearing against the first mentioned plate, a pair of yieldable arms, and hinge connections between the outer ends of such arms and the end portions of such plates.

5. A bumper comprising a flat yieldable plate adapted to extend across a vehicle, a reinforcing plate bearing against the first mentioned plate and having its ends within and in proximity to the ends of such first mentioned plate, a pair of yieldable arms, each having its outer end bent outwardly, a pair of clamping devices connecting the said plates and located within and spaced from the ends of the second plate, and a pivotal connection between the outer end of each of said arms and the clamping device.

In testimony whereof, we hereunto affix our signatures.

CHRISTIAN GIRL.
WAYNE E. DUNSTON.
JOHN G. UTZ.